US012074669B2

(12) United States Patent
Li et al.

(10) Patent No.: US 12,074,669 B2
(45) Date of Patent: Aug. 27, 2024

(54) METHOD, BASE STATION, SYSTEM AND COMPUTER PROGRAM FOR MASSIVE MIMO COMMUNICATION

(71) Applicant: MITSUBISHI ELECTRIC CORPORATION, Tokyo (JP)

(72) Inventors: Qianrui Li, Rennes (FR); Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 394 days.

(21) Appl. No.: 17/605,400

(22) PCT Filed: Apr. 1, 2020

(86) PCT No.: PCT/JP2020/015756
§ 371 (c)(1),
(2) Date: Oct. 21, 2021

(87) PCT Pub. No.: WO2020/250556
PCT Pub. Date: Dec. 17, 2020

(65) Prior Publication Data
US 2022/0247463 A1    Aug. 4, 2022

(30) Foreign Application Priority Data

Jun. 13, 2019   (EP) .................................... 19305758

(51) Int. Cl.
*H04B 7/06*     (2006.01)
*H04B 7/0417*   (2017.01)

(52) U.S. Cl.
CPC ......... *H04B 7/0617* (2013.01); *H04B 7/0417* (2013.01); *H04B 7/0632* (2013.01); *H04B 7/0695* (2013.01)

(58) Field of Classification Search
CPC .. H04B 7/0417; H04B 7/0617; H04B 7/0632; H04B 7/0695
See application file for complete search history.

(56) References Cited

U.S. PATENT DOCUMENTS

| 10,277,338 B2* | 4/2019 | Reial ..................... H04W 16/28 |
| 10,374,670 B2* | 8/2019 | Bethanabhotla ..... H04B 7/0452 |
| 10,742,298 B2* | 8/2020 | Nilsson ................ H04B 7/0695 |
| 11,082,176 B2* | 8/2021 | Liu ........................ H04B 7/063 |

(Continued)

FOREIGN PATENT DOCUMENTS

| CA | 2846830 A1 * | 3/2013 | ............. H04B 17/24 |
| CA | 3075282 A1 * | 3/2019 | ........... H04B 7/0452 |

(Continued)

OTHER PUBLICATIONS

Japanese Office Action for Japanese Application No. 2021-568453, dated Aug. 2, 2022, with English translation.

*Primary Examiner* — Eric Nowlin
(74) *Attorney, Agent, or Firm* — Birch, Stewart, Kolasch & Birch, LLP

(57) ABSTRACT

The invention relates to a method of massive MIMO communication, comprising: —forming transmission beam set (Φ), by a base station (BS), with privileged channel directions; —designing additional beam set (Θ) for optimizing the transmission beam set, so as to detect channel direction change outside the privileged channel directions.

12 Claims, 3 Drawing Sheets

(56) References Cited

U.S. PATENT DOCUMENTS

| | | | | |
|---|---|---|---|---|
| 11,152,992 | B2 * | 10/2021 | Zhou | H04B 7/063 |
| 11,272,429 | B2 * | 3/2022 | Islam | H04W 24/08 |
| 11,483,053 | B2 * | 10/2022 | Kapetanovic | H04B 7/0639 |
| 11,782,119 | B2 * | 10/2023 | Newman | G01S 1/0428 |
| | | | | 342/367 |
| 2005/0215261 | A1 * | 9/2005 | Cha | H04B 7/0695 |
| | | | | 455/452.2 |
| 2009/0232240 | A1 | 9/2009 | Lakkis | |
| 2016/0088648 | A1 | 3/2016 | Xue et al. | |
| 2016/0127919 | A1 * | 5/2016 | Hui | H04B 7/06952 |
| | | | | 342/371 |
| 2017/0237477 | A1 * | 8/2017 | Fujio | H04B 7/0617 |
| | | | | 370/329 |
| 2018/0049042 | A1 * | 2/2018 | Yu | H04B 7/088 |
| 2018/0062770 | A1 * | 3/2018 | Reial | H04B 7/063 |
| 2018/0131486 | A1 * | 5/2018 | Liu | H04B 7/0695 |
| 2018/0234912 | A1 * | 8/2018 | Islam | H04W 24/08 |
| 2018/0249453 | A1 * | 8/2018 | Nagaraja | H04B 7/0632 |
| 2019/0089428 | A1 * | 3/2019 | Bethanabhotla | H04B 7/0452 |
| 2019/0182683 | A1 * | 6/2019 | Khirallah | H04B 7/0695 |
| 2019/0247680 | A1 * | 8/2019 | Mayer | G16H 20/40 |
| 2019/0386733 | A1 * | 12/2019 | Nilsson | H04L 5/0048 |
| 2020/0204237 | A1 * | 6/2020 | Zhou | H04B 7/0408 |
| 2021/0175953 | A1 * | 6/2021 | Nilsson | H04B 7/0632 |
| 2021/0203398 | A1 * | 7/2021 | Kapetanovic | H04W 24/10 |
| 2023/0188189 | A1 * | 6/2023 | Raghavan | H04B 17/318 |
| | | | | 370/252 |

FOREIGN PATENT DOCUMENTS

| | | | | |
|---|---|---|---|---|
| CN | 104660311 | A * | 5/2015 | H04B 7/0469 |
| CN | 108111199 | A * | 6/2018 | H04B 17/318 |
| CN | 108781103 | A * | 11/2018 | H04B 17/16 |
| CN | 104660311 | B * | 3/2019 | H04B 7/0469 |
| CN | 109906588 | A * | 6/2019 | H04B 7/0617 |
| CN | 110324072 | A * | 10/2019 | H04B 7/0617 |
| CN | 110324072 | B * | 9/2020 | H04B 7/0617 |
| CN | 112204897 | A * | 1/2021 | H04B 17/318 |
| CN | 113473490 | A * | 10/2021 | H04B 7/0617 |
| CN | 108781103 | B * | 3/2022 | H04B 17/16 |
| CN | 116015378 | A * | 4/2023 | |
| EP | 2387162 | A2 | 11/2011 | |
| EP | 2387162 | A3 | 1/2014 | |
| EP | 2573252 | A1 | 11/2019 | |
| EP | 3692646 | A1 * | 8/2020 | H04B 7/0469 |
| EP | 3504854 | B1 * | 3/2021 | H04B 7/0617 |
| EP | 3832901 | A1 * | 6/2021 | H04B 7/0617 |
| EP | 3832901 | B1 * | 9/2022 | H04B 7/0617 |
| EP | 4106224 | A1 * | 12/2022 | H04B 7/0617 |
| EP | 3682554 | B1 * | 2/2024 | H04B 7/0452 |
| EP | 3804158 | B1 * | 2/2024 | H04B 17/318 |
| ES | 2867923 | T3 * | 10/2021 | H04B 7/0617 |
| ES | 2929848 | T3 * | 12/2022 | H04B 7/0617 |
| JP | 2011-526429 | A | 10/2011 | |
| JP | 2017-535093 | A | 11/2017 | |
| JP | 2020502837 | A * | 1/2020 | |
| JP | 6860152 | B2 * | 4/2021 | H04B 7/0617 |
| KR | 20190064582 | A * | 6/2019 | |
| KR | 102228745 | B1 * | 3/2021 | |
| RU | 2707735 | C1 * | 11/2019 | H04B 7/0617 |
| RU | 2726850 | C2 * | 7/2020 | H04B 7/0617 |
| TW | 201734439 | A * | 10/2017 | G01B 11/00 |
| WO | WO-2013032188 | A2 * | 3/2013 | H04B 17/24 |
| WO | WO-2014183707 | A1 * | 11/2014 | H04B 7/0469 |
| WO | WO-2016084182 | A1 | 6/2016 | H04B 7/06 |
| WO | WO-2017162283 | A1 * | 9/2017 | H04B 17/16 |
| WO | WO-2018202216 | A1 * | 11/2018 | H04B 17/318 |
| WO | WO-2019110123 | A1 * | 6/2019 | H04B 7/0469 |
| WO | WO-2019160973 | A1 * | 8/2019 | |
| WO | WO-2019228652 | A1 * | 12/2019 | H04B 17/318 |
| WO | WO-2022184276 | A1 * | 9/2022 | H04B 7/0456 |

* cited by examiner

| User | 1 | | 2 | | | 3 |
|---|---|---|---|---|---|---|
| Preferred UL beam(s) | 2 | 4 | 3 | 5 | 6 | 8 |

METHOD, BASE STATION, SYSTEM AND COMPUTER PROGRAM FOR MASSIVE MIMO COMMUNICATION

TECHNICAL FIELD

The present invention relates to method and system of massive MIMO (Multiple-Input Multiple-Output) communication. In particular, the present invention relates beam set design for multicast system such as for factory automation multicast system, which refers to beam management at base station side for a downlink broadcast system to multiple users.

BACKGROUND ART

In the previous generations of telecommunication networks, when considering broadcast services, a coverage area was defined from a given quality of service. This is the case for DVB standards wherein a target SNR is defined and users experiencing radio link condition leading to a SNR above this target can receive the video stream while other users can't. This approach is not efficient in terms of spectral efficiency when the base station has knowledge about the radio condition, and more generally the channel observed by each user.

In the next generation communication system operating over 6 GHz band, with the advent of active antenna arrays, more sophisticated beams can be created. Narrower and more directive beams can be created so as to compensate the high attenuation and to guarantee the user experience for distant and isolated users.

To achieve the large beamforming gain with reasonable implementation complexity, hybrid beamforming architecture is frequently used. The analogue beams on each panel or antenna arrays are adapted through phase shifters, switches or lens. Users measure a set of analogue beams and report associated metrics to base station in order to let the base station assigns beams to each user. At the base station side, the configuration of multiple beams is through multiple so-called "beamformed reference signals" which can be transmitted by base station. Each reference signal is beamformed with an associated beam pointing in a particular direction. Upon receiving each beamformed reference signal, users can report to base station the optimal transmitting beam index or indices of multiple preferred transmitting beams with associated beam quality metrics. With the beam report, the base station can select the serving beam(s) and indicate the index of transmitting beam for the users. The beamformed reference signal can be transmitted periodically or aperiodically. Depending on the system load and equipment capability, sweeping over coverage with a smaller dimension coarse beamformed reference signal set or with a more accurate beamformed reference signal set with more beam directions is possible. It is also capable of configuring a sweeping across a small number of transmitting beams covering smaller angular area or performing a wider angular area and finer beam sweeping.

If multiple preferred beams can be configured to one user, beam directions corresponding to multiple dominant paths can be presented. However, if there is only a single beam for each user, the selected beam can only represent the direction of the strongest path of the user channel, which is apparently not the optimal beamforming direction to precode the channel. The optimal direction is the direction of the user channel $h_k$, as the absolute value of the inner product of a beam w and the user channel $h_k$ is maximized when w is in the direction of the channel.

Consider that the phase array used for beamforming is readily configurable, which indicates that we can tune easily the phase for each entries of the beam vector, we can generate beams that are pointing to a more precise direction rather than choosing one beam direction in the restricted beam set.

A configurable beam set and a restricted beam set have their respective advantages and disadvantages. For example, the advantages of the configurable beam are they have more precise beam direction and better multicast rate performance, and the disadvantages are their device prices are quite expansive and need complexity for beamforming design as well as large feedback overhead. The advantages of the restricted beam set are their device prices are relative low and need low complexity beam forming design as well as low feedback overhead, and the disadvantages of the restricted beam set are they can only provide a few beam directions with worse multicast rate performance than the configurable beam.

Due to the aforementioned advantages and shortcomings, EP18305635 introduced a beamforming design algorithm which is a trade-off between the performance and the complexity. It has proposed that new beamforming directions can be created by linear combination of two existing beams in the current beam candidate set.

Such a beam merging procedure will lead to a 'living' beam set. When two beams are merged to create a new beam, the two original beams will be deleted from the beam set and the new beam will be added into the beam set. Therefore, the cardinality of the beam set will be reduced and the beams in the current beam set will be more and more adapted to maximize the multicast rate given the current users' channel conditions. Normally, the initial beam set is isotropically distributed so as to ensure the coverage. With the beam merging procedure, the distribution of the beam direction in the initial beam set will be changed. In the end, the beam set contains beam directions dedicated to the given multicast realization.

However, a realistic channel is often dynamic. Indeed, for a fixed environment, the base station will focus energy on the more efficient directions that allow serving the users. This can include bouncing on walls or objects to attain users in a non-line of sight case. However, due to user mobility or channel fluctuation, the beam direction inside the beam set after merging cannot be still adapted to the user.

In addition, new users may move or appear in the coverage of the base station and get attached to it. New path can be available in the presence of a new reflecting object. Thus, it is of interest to monitor other directions than the one already identified as the most relevant, to look for new opportunities. In this case, the current beam set after the merging is not capable of new beam directions.

SUMMARY OF INVENTION

The invention aims to improve the situation.

In this regard, the present invention proposes a method of massive MIMO communication, comprising:
  forming transmission beam set, by a base station, with privileged channel directions;
  designing additional beam set for optimizing the transmission beam set, so as to adapt to channel direction change, for example to detect the channel direction change outside the privileged channel directions, wherein this step can be repeated whenever the channel directions are changed.

It is then possible to refine the beam so as to be adapted to the user mobility or channel fluctuation, as well as to detect a new user move or appear in the coverage of the base station.

In an embodiment, forming transmission beam set comprises updating an initial beam set, which normally covers the entire space without privileged channel directions, by the base station, into the transmission beam set, which has privileged channel directions that optimize the multicast performance with the current given receivers locations.

In this regard, a more accurate channel direction can be obtained for the better multicast performance.

In particular, forming transmission beam set comprises:
sending, by the base station, beamformed reference signals with beam in the initial beam set to at least one user;
calculating and reporting, by the at least one user, quality metric g ($y_{k,\varphi_i}^{(0)}$) of the initial beam set to the base station; and
merging initial beam set, by the base station, on the basis of the quality metric of the initial beam set to the base station, so as to form the transmission beam set with privileged channel directions for the at least one user.

In addition, designing additional beam set comprises:
sending, by the base station, beamformed reference signals with beam in the transmission beam set with privileged channel directions to the at least one user;
calculating and reporting, by the at least one user, quality metric g($y_{k,\varphi_i}$) of the transmission beam set to the base station; and
designing the additional beam set for optimizing the transmission beam set, by the base station, on the basis of the initial beam set, the quality metric g($y_{k,\varphi_i}$) of the transmission beam set, and an arbitrary design criterion q(.).

In this case, additional beam set is designed so as to optimize the transmission beam set.

In another embodiment, forming transmission beam set comprises a linear beam merging of the beams in initial beam set. Therefore, several simple merging algorithms can be adapted instead of using complicated merging steps.

In particular, the additional beam set is designed to refine the privileged channel directions in the transmission beam set in case of channel fluctuation or user mobility.

Alternatively, the additional beam set is designed to detect new channel directions or new entered users.

In an embodiment, forming transmission beam set comprises a non-linear beam merging of the beams in initial beam set. Therefore, the method can be adapted to more complicated situations where linear beam merging algorithm is not applicable.

In particular, the additional beam set is designed to detect new channel directions or new entered users.

Alternatively, the additional beam set (Θ) is obtained by machine learning.

In another embodiment, the additional beam set is irrelevant of the transmission beam set, so that the method can be adapted in a more flexible manner.

In another embodiment, the additional beam set is a hierarchical refinement of the transmission beam set.

The present invention also proposes a base station, equipped with a plurality of antennas forming a radio frequency chain and adapted to form and transmit transmission beam set with privileged channel directions, wherein the base station is configured to design additional beam set for optimizing the transmission beam, so as to adapt to channel direction change, such detect the channel direction change outside the privileged channel directions.

Similarly, with such a base station, it is then possible to refine the beam so as to be adapted to the user mobility or channel fluctuation, as well as to detect a new user move or appear in the coverage of the base station.

In addition, the present invention further proposes a massive MIMO communication system, comprising:
a base station, equipped with a plurality of antennas forming a radio frequency chain and adapted to form and transmit transmission beam set with privileged channel directions;
a set of receivers, each associated to a given user and adapted to receive the transmission beam set;
wherein the base station is configured to design additional beam set for optimizing the transmission beam set, so as to adapt to channel direction change, for example to detect the channel direction change outside the privileged channel directions.

Furthermore, the present invention also proposes a computer program comprising program code to be executed by a processor, the program code being adapted to performance of a method as claimed in any one of the abovementioned method when executed by the processor. A flow chart of a general algorithm of the computer program can be represented as an example by FIG. 4. The invention aims also at a non-transitory computer storage medium storing instructions of such a computer program.

Thanks to the present invention, additional beam set is introduced so as to enable refinement for the privileged data transmission directions in case of channel variation and to track any change in the channel propagation that cannot be observed by the existing beams in the beam set. Moreover, the additional beam set is optimally designed so as to achieve a trade-off between the system overhead due to beam sweeping and a capability to discover or track any change in the channel propagation that cannot be observed through the reference signal sent through the beams used for data transmission.

Other features and advantages of the present invention will appear in the description hereinafter, in reference to the appended drawings.

DESCRIPTION OF EMBODIMENT

Figure 1:
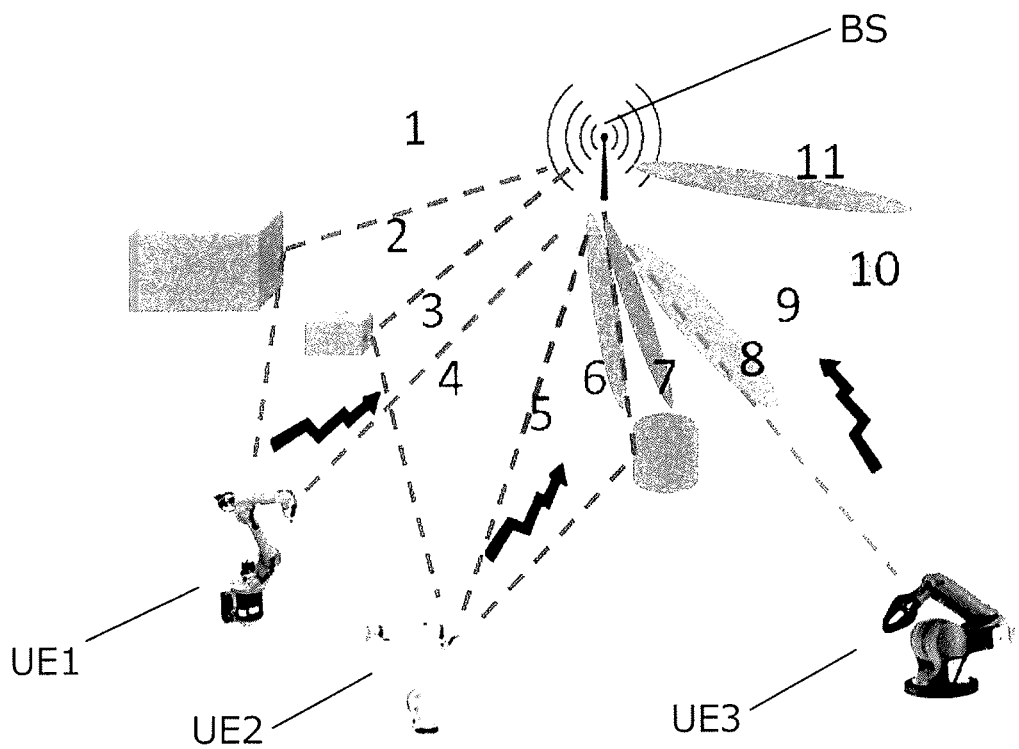
FIG. 1 illustrates a multicast system according to the present invention (before beamforming).

Referring to FIG. 1, it shows a multicast system operating over 6 GHz band according to the present invention, comprising:
A base station BS, which is equipped with active antenna arrays and is adapted to form and receive/transmit sophisticated beams 1 to 11 with band over 6 GHz.

Figure 2:
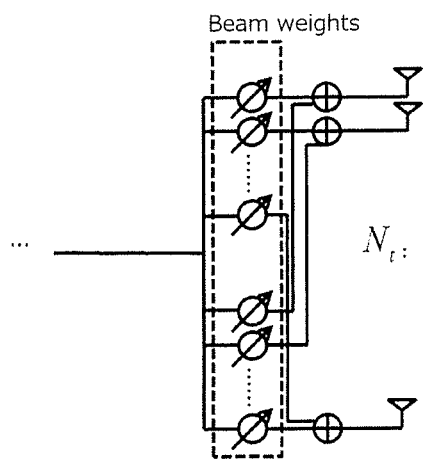
FIG. 2 illustrates a phase shifter with one RF chain in the base station.

In particular, for example as shown in FIG. 2, the base station BS is equipped with $N_t$ antennas and 1 RF chain, wherein beamforming can be implemented by any devices including but not limited to phase shifters, switches and optical lens. The connection architecture can be fully connected to all antenna elements or partially connected to an arbitrary subset of antenna elements. Without loss of generality, we consider hereby a phase shifter fully connected architecture with one RF chain. Generalization to other devices or architectures is known by a person skilled in the art.

A set of K receivers RX, each associated to a given user UE, equipped with one receive antenna. The receivers RX are adapted to receive beams from the base station BS. Generalization to several receive antennas is known by the person skilled in the art.

The base station BS forms and transmits initial transmission beam $\Phi^{(0)}$ set in a predefined area. For example in FIG. 1, an initial beam set including 11 transmission beams are distributed in a 180-degree angular area, wherein three users UE1, UE2, and UE3 respectively equipped with receivers RX1, RX2, and RX3, for example three robotic arms that can wirelessly connect to the base station BS, are located in the angular area and are adapted to receive beam set. Those users are initially stationary relative to the base station BS.

Figure 4:
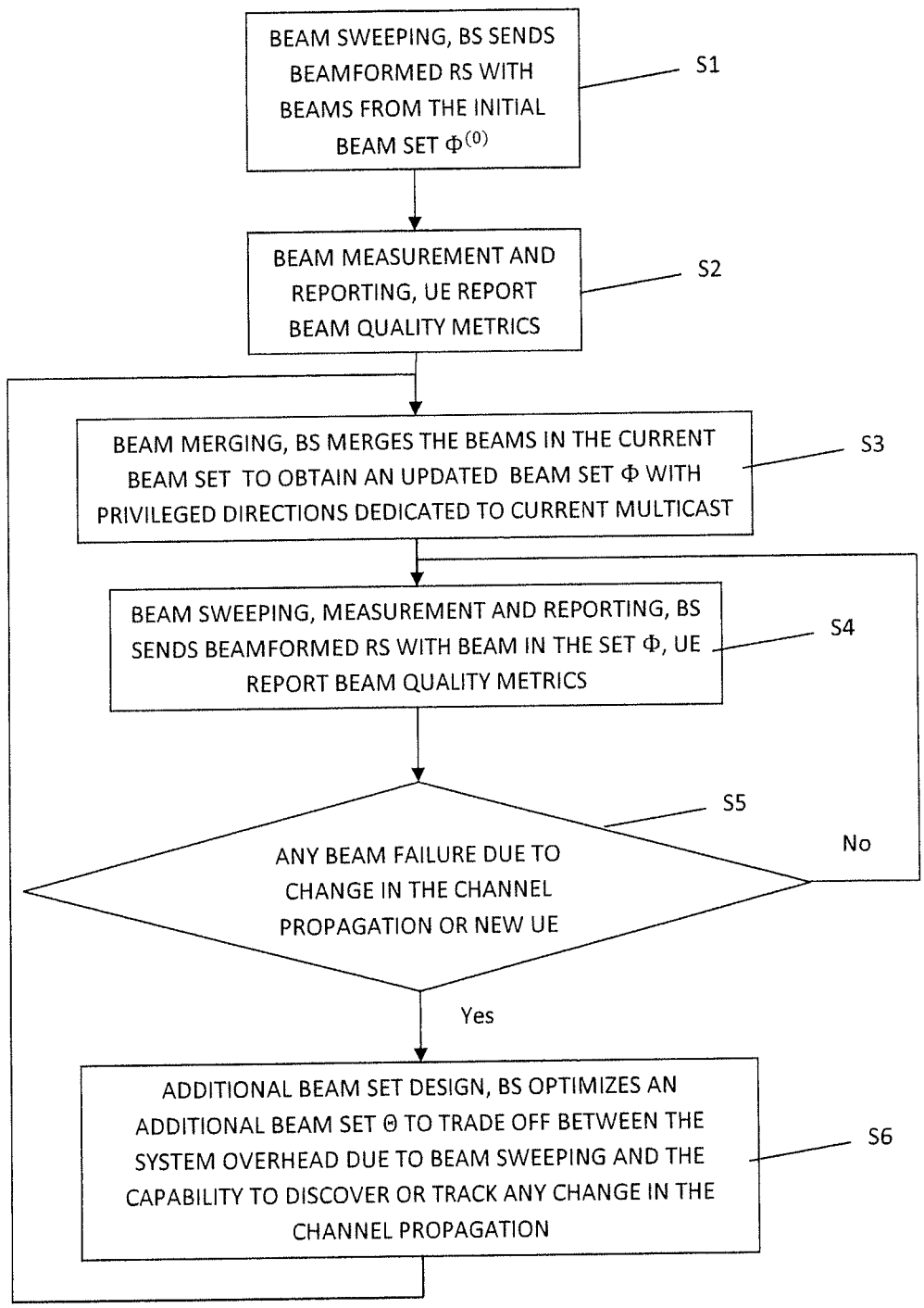
FIG. 4 is a flowchart of an illustrative method according to the invention.

Referring to FIG. 4, in an initial phase in step S1, during beam sweeping, the base station BS sends beamformed reference signal RS with beams belonging to initial transmission beam set $$\Phi^{(0)} = \left\{ \varphi_1^{(0)} \cdots \varphi_{N_W^{(0)}}^{(0)} \right\}.$$

Each user UE, as shown in step S2, will receive the beamformed reference signal RS which has gone through the propagation channels, each user UE can estimate the channel which is precoded with different beams and feedback the quality metrics $g(y_{k,\varphi_i^{(0)}})$ to the base station BS.

Afterward, in step S3, a set of new beams $\Phi$ are merged from the initial transmission beam set $\Phi^{(0)}$, by means of beamforming design algorithm in the art, such as the one in EP18305635 which describes a linear combination of two beam codeword. Alternatively, it is also possible to merge the beams in a non-linear approach, which is obtained by machine learning technology.

Figure 3:
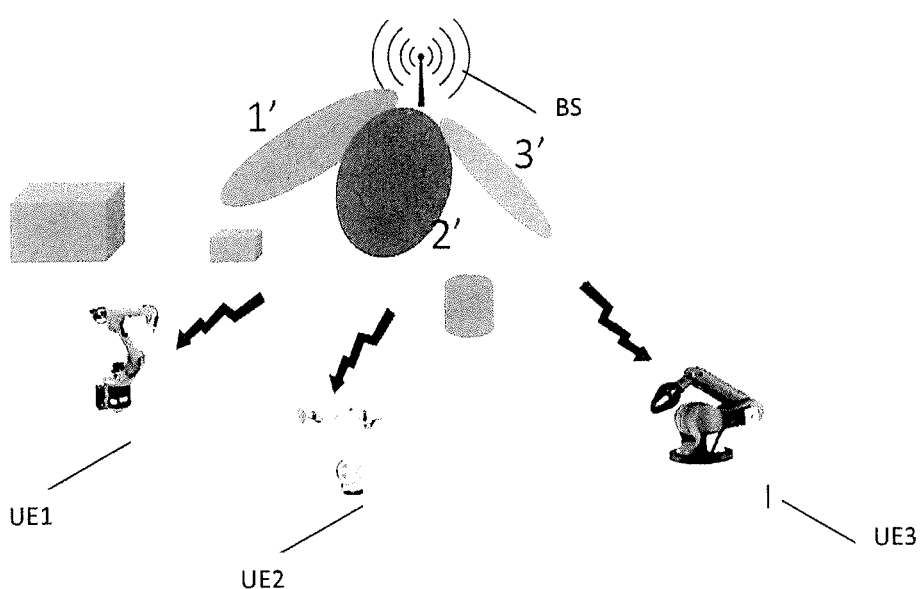
FIG. 3 illustrates a multicast system according to the present invention (after beamforming/merging).

The merged beams 1',2' and 3' in the new beam set (are now with privileged directions for current three users UE1, UE2, and UE3 configuration and transmission scenario, as shown in FIG. 3. In particular, the base station can focus energy on the more efficient directions that allow serving the users, considering the situation where beams are bouncing on walls or reflecting objects O to attain users in a non-line of sight case. Therefore, after the beam merging for the initial transmission beam set $\Phi^{(0)}$, the new directions of the new beams 1',2', and 3' are created to concentrate the transmitted energy as accurately as possible in the privileged directions corresponding to the current user positions and targeted service, such as uncast or multicast.

When the users and/or the reflecting objects are moving, the current beams may no longer targeting the users, which leads to signal attenuation or loss. It is then in the second phase to detect and track the movement so as to change the path direction of the beam and make the beams substantively and constantly targeting the users.

In the second phrase in step S4, the base station BS sends beamformed reference signals RS with beams belonging to beam set (P.

Each user UE receive the beamformed reference signals RS which have gone through the propagation channels, each user UE can estimate the channel which is precoded with different beams and feedback the quality metrics to the base station BS.

Then in step S5, when there is any beam failure due to change in the channel propagation or new user UE detected, an additional beam set design step in S6, detailed below, will be launched, if not, the second phases is repeated.

In step S6, based on the previous beam set $\Phi$, the initial beam set $\Phi^{(0)}$, the reported beam quality metrics and an arbitrary design criterion, an additional beam set $\Theta = \{\theta_1 \ldots \theta_{N_A}\}$ will be optimized, so as to adapt to channel direction change, especially outside the previous privileged channel directions.

According to one embodiment, the beams can be merged to create by liner beam merging and non-linear beam merging.

For the linear beam merging, this is essentially provided by EP 18305635, wherein linear combination of two beam codeword is used, and the algorithm in EP 18305635 requires full channel knowledge.

For the non-linear beam merging, for example, the new beam is formulated by combination of beams in the phase domain. This indicates that beam vectors may have in the following form:

$$\varphi_i = \frac{1}{N_t} \begin{pmatrix} e^{-j\omega_{i,1}} \\ \vdots \\ e^{-j\omega_{i,N_t}} \end{pmatrix}$$

With phase domain combination, w=v($\Phi$) reads:

$$w = v(\Phi) = \frac{1}{N_t} \begin{pmatrix} e^{-j\left(\sum_{i=1}^{N_W} c_i \omega_{i,1}\right)} \\ \vdots \\ e^{-j\left(\sum_{i=1}^{N_W} c_i \omega_{i,N_t}\right)} \end{pmatrix}$$

A deep learning based procedure, performed offline based on the initial beam set $\Phi^{(0)}$, can be used to obtain an estimation function of the multicast rate using the new beam w based on the nonlinear beam combination w=v($\Phi$) and the reported beam quality metrics $g(y_{k,\varphi_i})$.

According to another embodiment, the beamformed reference signals RS received at user UE k using the transmission beams $\varphi_i$ or $\theta_j$ can be denoted as:

$$y_{k,\varphi_i} = h_k^H \varphi_i s + n_{k,\varphi_i}$$

$$y_{k,\theta_j} = h_k^H \theta_j s + n_{k,\theta_j}$$

Each transmission beam $\varphi_i, \theta_j \in \mathbb{C}^{N_t}$ is a $N_t$ dimension vector. Where s is the scalar transmitting pilot signal at the RF chain, $n_{k,\varphi_i}, n_{k,\theta_j}$ are scalar noise random variables for user k when beam $\varphi_i, \theta_j$ are used, respectively. The scalar $y_{k,\varphi_i}, y_{k,\theta_j}$ are received signals for user k when beam $\varphi_i, \theta_j$ are used, respectively.

At user UE k, with the signal strength $y_{k,\varphi_i}, y_{k,\theta_j}$ of the beamformed reference signal RS, where $\varphi_i \in \Phi$, $\omega_j \in \Theta$, the user UE can estimate and report to the base station BS some quality metric of the beamformed channel, which can be written as $g(y_{k,\varphi_i}), g(y_{k,\theta_j})$. The function g(.) represents any possible processing at the user UE side with the knowledge of the signal strength $y_{k,\varphi_i}, y_{k,\theta_j}$. One possible embodiment of g (.) function is a beamformed channel estimation to recover the precoded channel $h_k^H \varphi_i$ (or $h_k^H \theta_j$) together with a quantization and feedback of said information to the base station BS.

The additional beam set $\Theta$ can be optimized based on the previous beam set $\Phi$, the initial beam set $\Phi^{(0)}$, the reported beam quality metrics $g(y_{k,\varphi_i})$ and an arbitrary design criterion q(.), such as guarantee privileged beam direction refinement and enhance the coverage while keeping beam sweeping overhead relatively low. The problem can be formulated as:

$$\max_\Theta \quad q(\Phi, \Theta, g(y_{k,\varphi_i}), \Phi^{(0)})$$

$$\Phi = \{\varphi_1 \cdots \varphi_{N_W}\}$$

$$\text{s.t.} \quad \Phi^{(0)} = \left\{\varphi_1^{(0)} \cdots \varphi_{N_W^{(0)}}^{(0)}\right\}$$

$$\theta_j \in \Theta, \theta_j^H \theta_j = 1$$

The details of additional beam design respectively for linear beam merging and non-linear beam merging are now discussed below.

For the additional beam design for linear beam merging, there are two main targets for introducing additional beam set:
- Introduce beams that help to refine the privileged channel directions in beam set $\Phi$ in case of channel fluctuation or user mobility, we can denote the union of these beams as $\Theta^R$
- Introduce beams that helps to detect new channel paths or new entered users, we can denote the union of these beams as $\Theta^D$ If the beam merging procedure is a linear combination of beams in the beam set, the cardinality of the beam set $\Theta^R$ can be decided according to the nature of the transmission in downlink DL and uplink UL.

For example, consider the following uplink UL beam sweeping procedure to determine the unicast beam for each user, a downlink DL beam sweep to determine the preferred beam(s) for each user will work in a similar manner. The initial beam set $\Phi^{(0)}$ includes 11 beams, as shown in FIG. 1. For each of the user, after beam sweeping, the preferred uplink UL beams are denoted in a table.

Consider this is a TDD system, there exists channel reciprocity. Therefore the preferred downlink DL unicast beam is the same as the uplink UL unicast beam for each user. In the downlink DL, after the linear beam merging, we can have the beamforming as shown in FIG. 3.

The beam set after merging has cardinality of 3, i.e. beam 1', 2', and 3'. The beam 1' is a linear combination of the beam 2 and 4 in the initial beam set, the beam 2' is a linear combination of the beam 3, 5, 6 in the initial beam set. The beam 3' is beam 8 inside the initial beam set. The beam set after merging can be written as $\Phi = \{c_{11}b_2 + c_{12}b_4, c_{21}b_3 + c_{22}b_5 + c_{23}b_6, b_8\}$. Let's abuse the notation $\Phi$ to indicate a matrix whose column is constructed by each beam in the set $\Phi$.

Let the uplink UL preferred beam set for all users be noted as $\Phi^{(UL)}$, $|\Phi^{(UL)}|=N$ (for example, N=6), the cardinality of the beam set $\Theta^R$ for privileged beam direction refinement is $|\Theta^R|=N-\text{rank}(\Phi)$. And each beam in beam set $\Theta^R$ should be selected in the way that:

$$\text{Span}(\Theta^R) = \text{Span}(\Phi^{(UL)}) \setminus \text{Span}(\Phi)$$

In this way, any new beam direction which is a linear combination of beams in the set $\Phi$ and $\Theta^R$ is a linear combination of the set $\Phi^{(UL)}$. As in the case of channel fluctuation or small time duration/low speed user mobility, we can assume that the dominant paths for each user haven't been changed, i.e., the preferred beams are still $\Phi^{(UL)}$. Therefore, by introducing $\Theta^R$, together with the merging beam set $\Phi$, we can refine the privileged direction for data transmission in the case of channel fluctuation and mobility, as long as the dominant path for each user is not changed.

In the example in the FIG. 3, $|\Theta^R|=3$, a possible beam set $\Theta^R = \{b_2, b_3, b_6\}$.

Now we design $\Theta^D$ to detect new path. The cardinality $|\Theta^D|=N_{overhead}-|\Theta^R|$. $N_{overhead}$ is a system parameter which indicates the maximum size of the additional beam set size allowed for beam sweeping. Each beam $\theta \in \Theta^D$ should satisfy:

$$\max_k \log(1 + |h_k^H \theta|^2) \leq \varepsilon$$

Where $\varepsilon$ is a threshold constant. This inequality guarantees that the new beam direction is not a privileged direction that is captured in the post-merging beam set $\Phi$.

Therefore, in order to design beam $\theta \in \Phi^D$ for new path detection, we will first find a function to estimate the $$\max_k \log(1 + |h_k^H \theta|^2)$$

based on $\Phi$, $\Phi^{(0)}$ and reported beam quality metrics $g(y_{k,\varphi_i})$:

$$q(\theta, \Phi, \Phi^{(0)}, g(y_{k,\varphi_i})) \approx \max_k \log(1 + |h_k^H \theta|^2) \leq \varepsilon$$

This function q(.) can be an formulated by constructing a channel estimator based on $g(y_{k,\varphi_i})$.

In case the beam merging is a linear combination, we can have $\text{span}(\Theta^D) = \text{span}(\Phi^{(0)}) \dagger \text{span}(\Phi)$. Since the initial beam set for beam sweeping aims at a full cell coverage, therefore $\text{span}(\Theta^D) \subset \text{span}(\Phi^{(0)})$ is guaranteed. Therefore the beam $\theta \in \Theta^D$ should satisfy:

$$\Phi(\Phi^H \Phi)^{-1} \Phi^H \theta = 0$$

$$q(\theta, \Phi, \Phi^{(0)}, g(y_{k,\varphi_i})) \leq \varepsilon$$

A possible way to generate the beam set $\Theta^D$ is the following pseudo code:
$\Theta^D = \emptyset$
While $|\Theta^D| \leq N_{overhead} - |\Theta^R|$
  Generate random vector $\alpha = (\alpha_1, \ldots, \alpha_{N_W^{(0)}-N_W})^T$, $\theta = (I - \Phi(\Phi^H \Phi)^{-1} \Phi^H)\alpha$
  Test if $q(\theta, \Phi, \Phi^{(0)}, g(y_{k,\varphi_i})) \leq \varepsilon$, if true, $\Theta^D = \Theta^D \cap \{\theta\}$, else continue;
End while For the additional beam design for none-linear beam merging, it is difficult to find the beam set $\Theta^R$ which can help to refine the privileged directions in case of channel variation. Nevertheless, there doesn't exist a simple relation between the space spanned by the additional beam set $\Theta^D$ and the post-merging beam set $\Phi$. However, if the cardinality of the set $\Theta^D$ is known as $|\Theta^D|=N_o$ (for example, pre-defined according to beam sweeping overhead), we can still design more efficient additional beam set $\Theta^D$ for new path detection.

Since it is still true that for the new path detection, it is not necessary to introduce additional beam directions which overlap with the direction in the beam set $\Phi$. Let function $f_\alpha$ represents an arbitrary non-linear Xbeam merging function with some parameter $\alpha$ for the non-linear combination (this parameter vector $\alpha$ can be the phase domain combination coefficients cl as is illustrated above). It can be written that $\theta = f_\alpha(\Phi^{(0)})$, indicating that the additional beam direction can be constructed by a nonlinear combination of the initial beam set. In order to further indicates that the additional beam direction should be the directions in beam set $\Phi$, like in the linear combination, we can find a function to estimate the max log $(1+|h_k^H\theta|^2)$ based on $\Phi$, $\Phi^{(0)}$ and reported beam quality metrics $g(y_{k,\varphi_i})$:

$$q(\theta, \Phi, \Phi^{(0)}, g(y_{k,\varphi_i})) \approx \max_k \log(1 + |h_k^H\theta|^2) \le \varepsilon$$

This function q(.) can be formulated by constructing a channel estimator based on $g(y_{k,\varphi_i})$. It is possible to use a machine learning based method to derive this function.

A possible way to generate the beam set $\Theta^D$ is the following pseudo code:
$\Theta^D = \emptyset$
While $|\Theta^D| \le N_o$
  Generate random vector $\alpha$, generate the additional beam for new path detection $\theta = f_\alpha(\Phi^{(0)})$
  Test if q $(\theta, \Phi, \Phi^{(0)}, g(y_{k,\varphi_i})) \le \varepsilon$, if true, $\Theta^D = \Theta^D \cap \{\theta\}$, else continue;
End while In light of above, this invention proposes a system and a method for determining an additional beam sweeping codebook achieving a trade-off between the system overhead due to beam sweeping and a capability to discover or track any change in the channel propagation that cannot be observed through the reference signal sent through the current beams used for data transmission.

In the hybrid beamforming for millimetre wave massive MIMO, the analog beams are wideband. A beam sweeping procedure allows sounding the channel and is generally performed over a predefined codebook. This procedure can have a large impact on the system if the number of beams to be monitored is high.

By virtue of beam merging, these transmit beams are then optimized, from the channel sounding feedback, to concentrate the transmitted energy as accurately as possible in some privileged directions of space that corresponds to the current terminal positions and the targeted service (e.g., unicast or multicast).

The data transmitted in downlink or uplink carries reference symbols allow for channel sounding in these privileged directions at low cost in terms of overhead (the proportion of pilot symbols in a frame is small with respect to data). However, in case of change in channel propagation, those beams are insufficient to refine the privileged direction for data transmission or identify new direction. It is thus of interest to design additional beam sweeping codeword which provide knowledge that could not be obtained via the direct reference signal measurement and feedback.

Therefore, this invention proposes to design the beam sweeping codebook such that:

A first sub-codebook allows for refining the current transmission beam. This number is minimized, according to the nature of the transmission in DL and UL.

According to the remaining number of codewords available for sweeping, a second codebook is selected which is complementary to the one used for defining the beams for data transmission. This allows maximizing the sounding capability to detect any change in the channel outside the privileged directions.

In addition, as is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

The invention claimed is:

1. A method of massive MIMO communication, comprising:
  forming a transmission beam set ($\Phi$), by a base station (BS), with privileged channel directions;
  designing an additional beam set ($\Theta$) for optimizing the transmission beam set, so as to adapt to channel direction change outside the privileged channel directions;
  wherein forming the transmission beam set comprises updating an initial beam set $\Phi^{(0)}$, by the base station, into the transmission beam set ($\Phi$);
  wherein forming the transmission beam set ($\Phi$) comprises:
    sending, by the base station, beamformed reference signals with beam in the initial beam set $\Phi^{(0)}$ to at least one user (UE);
    calculating and reporting, by the at least one user, quality metric g $(y_{k,\varphi_i^{(0)}})$ of the initial beam set $\Phi^{(0)}$ to the base station; and
    merging the initial beam set, by the base station, on the basis of the quality metric of the initial beam set to the base station, so as to form the transmission beam set ($\Phi$) with privileged channel directions for the at least one user, and
  wherein designing the additional beam set comprises:
    sending, by the base station, beamformed reference signals with beam in the transmission beam set ($\Phi$) with the privileged channel directions to the at least one user;
    calculating and reporting, by the at least one user, quality metric $g(y_{k,\varphi_i})$ of the transmission beam set ($\Phi$) to the base station; and designing the additional beam set (Θ) for optimizing the transmission beam set, by the base station, on the basis of the initial beam set $\Phi^{(0)}$, the quality metric $g(y_{k,\varphi_j})$ of the transmission beam set, and an arbitrary design criterion q(.).

2. The method according to claim 1, wherein forming the transmission beam set (Φ) comprises a linear beam merging of the beams in initial beam set $\Phi^{(0)}$.

3. The method according to claim 2, wherein the additional beam set is designed to refine the privileged channel directions in the transmission beam set (Φ) to be adapted to channel fluctuation or user mobility.

4. A non-transitory computer readable medium comprising program code stored thereon, which is configured to be executed by a processor, the program code being adapted to performance of a method as claimed in claim 3 when executed by the processor.

5. The method according to claim 2, wherein the additional beam set (Θ) is designed to detect new channel directions or new entered users.

6. A non-transitory computer readable medium comprising program code stored thereon, which is configured to be executed by a processor, the program code being adapted to performance of a method as claimed in claim 5 when executed by the processor.

7. A non-transitory computer readable medium comprising program code stored thereon, which is configured to be executed by a processor, the program code being adapted to performance of a method as claimed in claim 2 when executed by the processor.

8. The method according to claim 1, wherein the additional beam set (Θ) is a hierarchical refinement of the transmission beam set (Φ).

9. A non-transitory computer readable medium comprising program code stored thereon, which is configured to be executed by a processor, the program code being adapted to performance of a method as claimed in claim 1 when executed by the processor.

10. The method of claim 1, wherein designing the additional beam set (Θ) for optimizing the transmission beam set includes selecting beams based on the initial beam set $\Phi^{(0)}$, the quality metric $g(y_{k,\varphi_j})$ of the transmission beam set, and an arbitrary design criterion q(.).

11. A base station, equipped with a plurality of antennas forming a radio frequency chain and adapted to form and transmit a transmission beam set (Φ) with privileged channel directions, wherein the base station is configured to design an additional beam set for optimizing the transmission beam set, so as to adapt to channel direction change outside the privileged channel directions.

12. A massive MIMO communication system, comprising:
   a base station, equipped with a plurality of antennas forming a radio frequency chain and adapted to form and transmit transmission beam set (Φ) with privileged channel directions;
   a set of receivers (RX), each associated to a given user (UE) and adapted to receive the transmission beam set (Φ);
   wherein the base station is configured to design an additional beam set for optimizing the transmission beam set, so as to adapt to channel direction change outside the privileged channel directions.

* * * * *